(12) United States Patent
Hong et al.

(10) Patent No.: US 12,437,579 B2
(45) Date of Patent: Oct. 7, 2025

(54) FACE IMAGE PROCESSING METHOD AND APPARATUS, COMPUTER-READABLE MEDIUM, AND DEVICE

(71) Applicant: TENCENT TECHNOLOGY (SHENZHEN) COMPANY LIMITED, Shenzhen (CN)

(72) Inventors: Zheming Hong, Shenzhen (CN); Jun Wang, Shenzhen (CN); Shaoming Wang, Shenzhen (CN); Runzeng Guo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 313 days.

(21) Appl. No.: 17/897,587

(22) Filed: Aug. 29, 2022

(65) Prior Publication Data
US 2022/0415082 A1 Dec. 29, 2022

Related U.S. Application Data

(63) Continuation of application No. PCT/CN2021/102644, filed on Jun. 28, 2021.

(30) Foreign Application Priority Data

Aug. 19, 2020 (CN) .......................... 202010838648.1

(51) Int. Cl.
*G06V 40/16* (2022.01)
*G06Q 20/40* (2012.01)
*G06T 7/73* (2017.01)

(52) U.S. Cl.
CPC ..... *G06V 40/166* (2022.01); *G06Q 20/40145* (2013.01); *G06T 7/74* (2017.01);
(Continued)

(58) Field of Classification Search
CPC ...... G06V 40/166; G06V 40/172; G06T 7/74; G06T 2207/10028; G06T 2207/30201; G06Q 20/40145
See application file for complete search history.

(56) References Cited

U.S. PATENT DOCUMENTS 9,818,023 B2    11/2017  Shor et al.
10,210,629 B2 *  2/2019  Ohba .................. G06V 10/751
(Continued)

FOREIGN PATENT DOCUMENTS

CN    104346608 A    2/2015
CN    104903677 A    9/2015
(Continued)

OTHER PUBLICATIONS

The World Intellectual Property Organization (WIPO) International Search Report for PCT/CN2021/102644 Sep. 28, 2021 6 Pages (including translation).
(Continued)

*Primary Examiner* — Gregory M Desire
(74) *Attorney, Agent, or Firm* — ANOVA LAW GROUP, PLLC

(57) ABSTRACT

A face image processing method includes: obtaining a plurality of lattice depth images acquired by performing a depth image acquisition on a target face from different acquisition angles; performing a fusion processing on the plurality of lattice depth images to obtain a dense lattice
(Continued)

depth image; and performing a face recognition processing on the dense lattice depth image to obtain a face recognition result.

18 Claims, 5 Drawing Sheets

(52) U.S. Cl.
CPC .. *G06V 40/172* (2022.01); *G06T 2207/10028* (2013.01); *G06T 2207/30201* (2013.01)

(56) References Cited

U.S. PATENT DOCUMENTS

| | | | | |
|---|---|---|---|---|
| 10,657,363 | B2* | 5/2020 | Alameh | G06T 7/20 |
| 11,074,466 | B2* | 7/2021 | Zhang | G06V 40/19 |
| 11,210,800 | B2* | 12/2021 | Zhang | G01B 11/25 |
| 11,218,634 | B2* | 1/2022 | Zhou | H04N 23/958 |
| 11,677,920 | B2* | 6/2023 | Simek | H04N 23/45 |
| | | | | 348/46 |
| 11,915,502 | B2* | 2/2024 | Lindner | G01S 7/4972 |
| 12,154,373 | B2* | 11/2024 | Chen | G06V 10/143 |
| 2013/0201187 | A1 | 8/2013 | Tong et al. | |
| 2016/0005179 | A1 | 1/2016 | Petyushko et al. | |
| 2019/0377071 | A1 | 12/2019 | Cheng | |

FOREIGN PATENT DOCUMENTS

| | | |
|---|---|---|
| CN | 107633165 A | 1/2018 |
| CN | 108319901 A | 7/2018 |
| CN | 108764024 A | 11/2018 |
| CN | 109816791 A | 5/2019 |
| CN | 110738078 A | 1/2020 |
| CN | 110738730 A | 1/2020 |
| CN | 111242097 A | 6/2020 |
| WO | 2020155908 A1 | 8/2020 |

OTHER PUBLICATIONS

The European Patent Office (EPO) The Extended European Search Report for 21857349.1 Oct. 25, 2023 60 Pages.
The State Intellectual Property Office of the People's Republic of China (SIPO) Office Action 2 for 202010838648.1 Nov. 21, 2023 16 Pages (including translation).
Shen Yehu, et al. "A 3D face model reconstruction method for face recognition." Journal of Circuit and System 12.6 (2007): 27-33.

* cited by examiner

_(12) United States Patent_ US 12,437,579 B2

FACE IMAGE PROCESSING METHOD AND APPARATUS, COMPUTER-READABLE MEDIUM, AND DEVICE

RELATED APPLICATION(S)

This application is a continuation application of PCT Patent Application No. PCT/CN2021/102644 filed on Jun. 28, 2021, which claims priority to Chinese Patent Application No. 202010838648.1, entitled "FACE IMAGE PROCESSING METHOD AND APPARATUS, COMPUTER-READABLE MEDIUM, AND DEVICE" and filed with the National Intellectual Property Administration, PRC on Aug. 19, 2020, all of which are incorporated herein by reference in entirety.

FIELD OF THE TECHNOLOGY

The present disclosure relates to the field of computer and communication technologies, and in particular, to a face image processing method and apparatus, a computer-readable medium, and a device.

BACKGROUND

Face recognition payment is a payment technology based on a face recognition system. The technology does not require wallets, credit cards, or mobile phones, and only needs to face a camera on a payment device when paying. After the camera collects consumer's facial information, the system automatically associates the consumer's facial information with a personal account, making the entire transaction process convenient and fast.

However, a face area containing the consumer's face may be cropped to obtain a to-be-recognized image, and then face recognition is performed on the to-be-recognized image to obtain the consumer's facial information. The face recognition is not precise enough when face recognition is directly performed on the to-be-recognized image. Therefore, it may be desirable to improve the precision of face recognition.

SUMMARY

Various embodiments of the present disclosure provide a face image processing method and apparatus, a computer-readable medium, and a device.

In one aspect, the present disclosure provides a face image processing method, performed by a payment processing server, the method including: obtaining a plurality of lattice depth images acquired by performing a depth image acquisition on a target face from different acquisition angles; performing a fusion processing on the plurality of lattice depth images to obtain a dense lattice depth image; and performing a face recognition processing on the dense lattice depth image to obtain a face recognition result.

In another aspect, the present disclosure provides a face image processing apparatus, the apparatus including: a memory storing computer program instructions; and a processor coupled to the memory and configured to execute the computer program instructions and perform: obtaining a plurality of lattice depth images acquired by performing a depth image acquisition on a target face from different acquisition angles; performing a fusion processing on the plurality of lattice depth images to obtain a dense lattice depth image; and performing a face recognition processing on the dense lattice depth image to obtain a face recognition result.

In yet another aspect, the present disclosure provides a non-transitory computer-readable storage medium storing computer program instructions executable by at least one processor to perform: obtaining a plurality of lattice depth images acquired by performing a depth image acquisition on a target face from different acquisition angles; performing a fusion processing on the plurality of lattice depth images to obtain a dense lattice depth image; and performing a face recognition processing on the dense lattice depth image to obtain a face recognition result.

In yet another aspect, the present disclosure provides a face-based payment device, the device including: a Dtof sensor, configured to acquire lattice depth images of a face; a micro motor, connected to the Dtof sensor, and configured to drive the Dtof sensor to rotate to acquire the lattice depth images of the face from different angles; and a processor, electrically connected to the Dtof sensor, the processor being configured to receive the lattice depth images acquired by the Dtof sensor, and configured to perform the face image processing method described in the embodiments.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
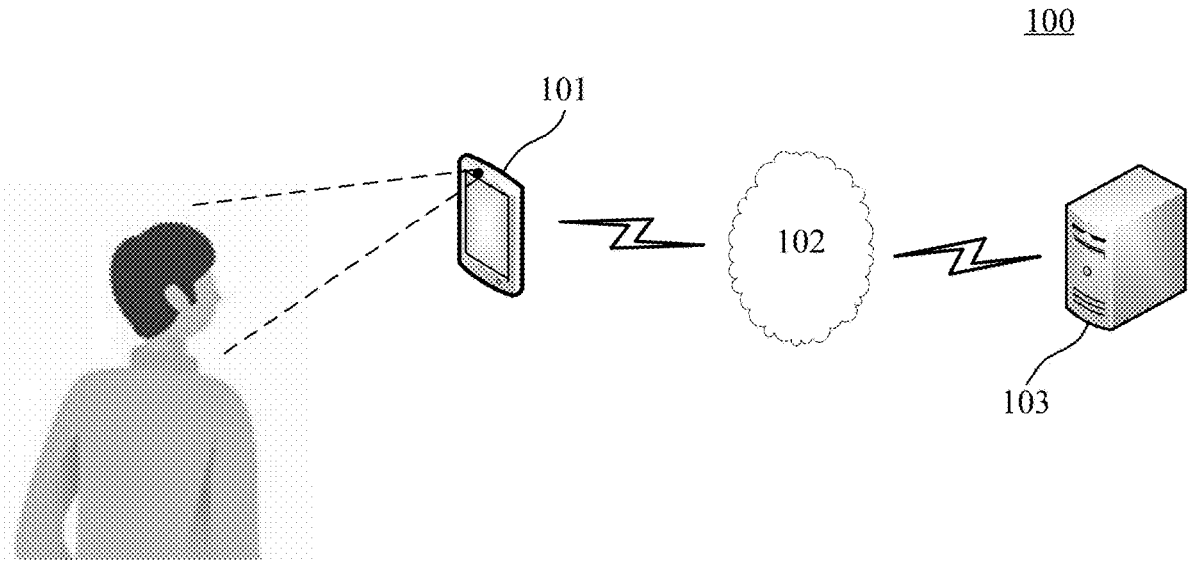
FIG. 1 is a schematic diagram of an exemplary system architecture to which a technical solution according to an embodiment of the present disclosure is applicable.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

"Plurality of" mentioned herein means two or more. And/or describes an association relationship for describing associated objects and represents that three relationships may exist. For example, A and/or B may represent the following three scenarios: Only A exists, both A and B exist, and only B exists. The character "/" generally indicates an "or" relationship between the associated objects.

The solutions provided in the embodiments of the present disclosure relate to technologies such as computer vision of artificial intelligence, and are described by using the following embodiments.

In the embodiments of the present disclosure, a Dtof depth map technology may be adopted when collecting face images for recognition. The Dtof depth map technology is a technology for directly measuring time of flight and then converting the time of flight into a depth. Alternatively, a structured light depth map technology may also be adopted. The structured light depth map technology is a technology for realizing depth map calculation based on key steps such as calibration, projection acquisition, and decoding calculation by encoding structured light. In certain embodiment(s), an Itof (indirect time-of-flight) depth map technology may also be adopted. The Itof depth map technology is a technology for indirectly measuring time of flight of light by measuring a phase offset and then converting the time of flight into a depth. However, compared with the Dtof depth map technology, the structured light depth map technology has higher costs, a lower integration, and a lower long-distance precision. In addition, compared with the Dtof depth map technology, the Itof depth map technology has a lower precision and a larger power consumption. Therefore, to reduce the power consumption in the face recognition process and improve the precision of face recognition, in the following embodiments of the present disclosure, the Dtof depth map technology is used as an example for a description.

As shown in FIG. 1, in an exemplary system architecture 100 of the present disclosure, a payment terminal 101, a network 102, and a payment processing server 103 may be included. The network 102 is configured to provide a medium of a communication link between the payment terminal 101 and the payment processing server 103. The network 102 may include various connection types, such as a wired communication link, a wireless communication link, or the like.

The quantity of the payment terminal 101, the quantity of the network 102, and the quantity of the payment processing server 103 in FIG. 1 are merely illustrative. The payment terminal 101 may include a tablet computer, a notebook computer, a personal computer (PC), a micro processing box, or other devices. The payment processing server 103 may be an independent physical server, may also be a server cluster or distributed system composed of a plurality of physical servers, and may also be a cloud server providing cloud computing services, such as a cloud service, a cloud database, cloud computing, a cloud function, cloud storage, a network service, cloud communication, a middleware service, a domain name service, a security service, a CDN, and a big data and artificial intelligence platform. The payment terminal 101 may be a smartphone, a tablet computer, a notebook computer, a desktop computer, a smart speaker, a smartwatch, or the like, but is not limited thereto.

In an embodiment of the present disclosure, a Dtof sensor is disposed on the payment terminal 101. The Dtof sensor is connected to a micro motor. The micro motor can drive the Dtof sensor to rotate to acquire lattice depth images of a face from different angles. When face payment is desirable, prompt information of the face payment may be displayed on the payment terminal 101, and then the Dtof sensor is driven to rotate by the micro motor to acquire a plurality of lattice depth images of the face. After acquiring the plurality of lattice depth images of the face, the payment terminal 101 may send the plurality of lattice depth images to the payment processing server 103 through the network 102. Then, the payment processing server 103 performs a fusion processing on the plurality of lattice depth images to obtain a dense lattice depth image. Further, a face recognition processing is performed on the obtained dense lattice depth image to obtain a face recognition result. After obtaining the face recognition result, the payment processing server 103 may perform a payment processing based on the face recognition result. That is, the payment processing is performed based on the recognized face. It can be seen that, in the embodiments of the present disclosure, the dense lattice depth image is obtained by performing a fusion processing on the plurality of lattice depth images acquired by the Dtof sensor. Therefore, a high-precision face recognition may be realized through the dense lattice depth image, improving the accuracy of the face recognition, and the power consumption of the face recognition may also be reduced.

The face image processing method provided by the embodiments of the present disclosure is generally performed by the payment processing server 103. Correspondingly, a face image processing apparatus is generally disposed in the payment processing server 103. However, in other embodiments of the present disclosure, the payment device may also have functions similar to those of the payment processing server, thereby performing the face image processing method provided by the embodiments of the present disclosure. For example, after acquiring the plurality of lattice depth images of the face, the payment terminal 101 may perform a fusion processing on the plurality of lattice depth images to obtain a dense lattice depth image. Further, a face recognition processing is performed on the obtained dense lattice depth image to obtain a face recognition result. After obtaining the face recognition result, the payment terminal 101 may send the face recognition result to the payment processing server 103, and then the payment processing server 103 may perform a payment processing based on the face recognition result.

Implementation details of the technical solutions of the embodiments of the present disclosure are described below in detail.

Figure 2:
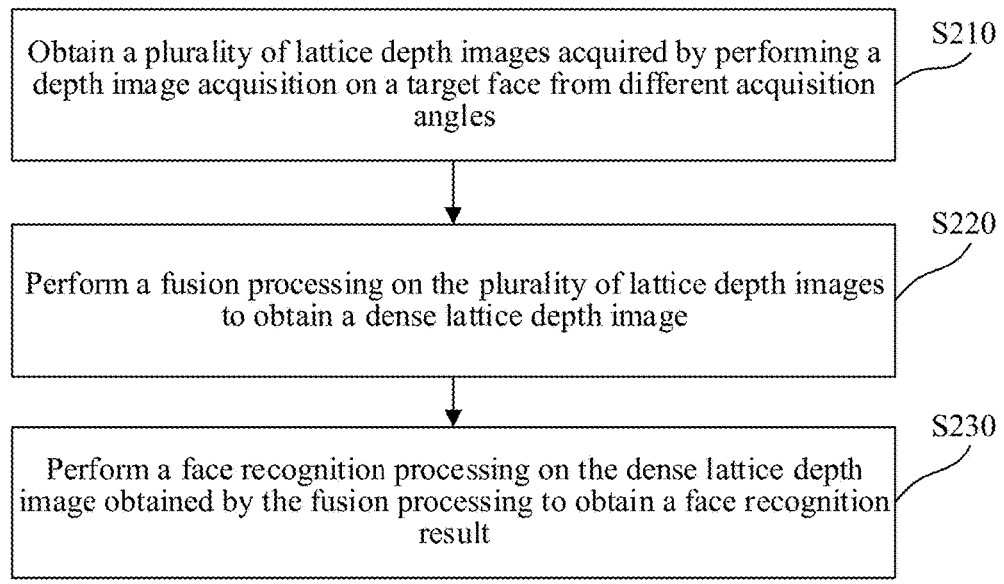
FIG. 2 is a schematic flowchart of a face image processing method according to embodiment(s) of the present disclosure.

FIG. 2 is a flowchart of a face image processing method according to an embodiment of the present disclosure. The face image processing method may be performed by a device with a computing processing function, for example, by the payment processing server 103 shown in FIG. 1. Referring to FIG. 2, the face image processing method includes at least steps S210 to S230, which are described in detail below:

In step S210, a plurality of lattice depth images acquired by performing a depth image acquisition on a target face from different acquisition angles are obtained.

In an embodiment, the lattice depth images are acquired by a Dtof sensor. When the Dtof sensor performs a depth image acquisition on a target face from different acquisition angles, the face may be kept still, and then the images may be acquired by controlling the Dtof sensor to rotate. Alternatively, the images may be acquired by keeping the Dtof sensor still and prompting the user to move the face, or may be acquired by moving both the Dtof sensor and the face.

In certain embodiment(s), when the rotation of the Dtof sensor is realized, the Dtof sensor may be driven to rotate by a micro motor. The depth image acquisition of the target face from different acquisition angles may be realized by the slight rotation of the Dtof sensor. In certain embodiment(s), the Dtof sensor may also be driven to rotate by other transmission mechanisms to realize the acquisition of the depth image of the face. When prompting the user to move the face to acquire the depth image, prompt information may be displayed on a display panel, or the user may be prompted to move the face by a speaker device issuing voice prompt information.

In step S220, a fusion processing is performed on the plurality of lattice depth images to obtain a dense lattice depth image.

In an embodiment, the process of performing a fusion processing on the plurality of lattice depth images by the payment processing server is to convert the plurality of lattice depth images into corresponding point cloud images, then perform a fusion processing on the point cloud images obtained through conversion to obtain a dense point cloud map, and then convert the dense point cloud map into a dense lattice depth image. The lattice depth image may also be referred to as a sparse lattice depth image. The point cloud image may also be referred to as a sparse point cloud image.

Figure 3:
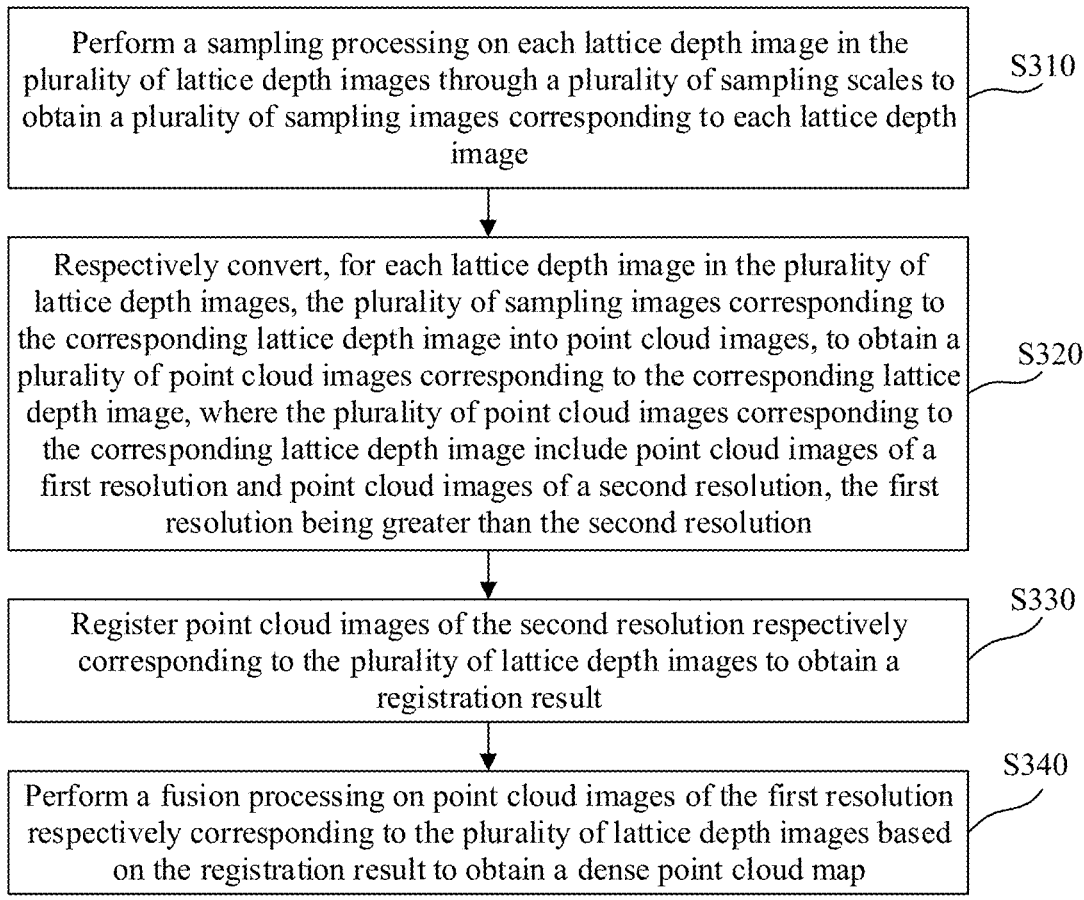
FIG. 3 is a schematic flowchart of converting a plurality of lattice depth images into corresponding point cloud images and performing a fusion processing on the point cloud images to obtain a dense point cloud map according to embodiment(s) of the present disclosure.

In an embodiment, as shown in FIG. 3, the process of converting each lattice depth image in the plurality of lattice depth images into a corresponding point cloud image, and performing a fusion processing on the point cloud images to obtain a dense point cloud map may include the following steps S310 to step S340:

In step S310, a sampling processing is performed on each lattice depth image in the plurality of lattice depth images through a plurality of sampling scales to obtain a plurality of sampling images corresponding to each lattice depth image.

In an embodiment, the payment processing server may perform a sampling processing on each lattice depth image in the plurality of lattice depth images through two sampling scales to obtain a sampling image of a first resolution and a sampling image of a second resolution corresponding to each lattice depth image, where the first resolution is greater than the second resolution, and the first resolution is less than or equal to a resolution of each lattice depth image. In certain embodiment(s), the first resolution may be equal to the resolution of each lattice depth image. In an embodiment, the sampling processing may be performed on each lattice depth image through three sampling scales or more sampling scales.

In step S320, for each lattice depth image in the plurality of lattice depth images, the plurality of sampling images corresponding to the corresponding lattice depth image are converted into point cloud images to obtain a plurality of point cloud images corresponding to the corresponding lattice depth image. The plurality of point cloud images corresponding to the corresponding lattice depth image include point cloud images of a first resolution and point cloud images of a second resolution. The first resolution is greater than the second resolution.

In an embodiment, that for each lattice depth image in the plurality of lattice depth images, the plurality of sampling images corresponding to the corresponding lattice depth image are converted into point cloud images includes: for each lattice depth image in the plurality of lattice depth images, based on a conversion relationship between the lattice depth images and point cloud coordinates, respectively converting the plurality of sampling images corresponding to the corresponding lattice depth image into the point cloud images.

There is a correspondence between the lattice depth images and the point cloud coordinates. Therefore, the payment processing server may respectively convert, based on the conversion relationship between the lattice depth images and point cloud coordinates, the plurality of sampling images corresponding to each lattice depth image into the point cloud images.

In step S330, point cloud images of the second resolution respectively corresponding to the plurality of lattice depth images are registered to obtain a registration result.

In an embodiment, that the point cloud images of the second resolution respectively corresponding to the plurality of lattice depth images are registered includes: performing a computing processing of matching points on the point cloud images of the second resolution respectively corresponding to the plurality of lattice depth images, to obtain matching points corresponding to the plurality of lattice depth images; and registering the point cloud images of the second resolution respectively corresponding to the plurality of lattice depth images according to the matching points.

The payment processing server may perform a computing processing of matching points on the point cloud images of the second resolution respectively corresponding to the plurality of lattice depth images, to obtain the matching points corresponding to the plurality of lattice depth images; and then register the point cloud images of the second resolution respectively corresponding to the plurality of lattice depth images according to the obtained matching points.

In an embodiment, the performing a computing processing of matching points on the point cloud images of the second resolution respectively corresponding to the plurality of lattice depth images includes: calculating, for point cloud images of the second resolution respectively corresponding to any two lattice depth images, a projection point of a point on one point cloud image onto another point cloud image by a projection algorithm, to obtain matching points between the any two lattice depth images; and determining matching points corresponding to the plurality of lattice depth images according to the matching points between the any two lattice depth images.

When calculating the matching points corresponding to the plurality of lattice depth images, the payment processing server may perform calculation by using two lattice depth images as a group, and then perform a combination to determine the matching points corresponding to the plurality of lattice depth images. In certain embodiment(s), for point cloud images of the second resolution respectively corresponding to any two lattice depth images, a projection point of a point on one point cloud image onto another point cloud image may be calculated by the projection algorithm to obtain matching points between the two lattice depth images; and then matching points corresponding to the plurality of lattice depth images are determined according to the matching points between the two lattice depth images.

In an embodiment, the plurality of lattice depth images may be grouped in pairs for calculation, to obtain the matching points between each two lattice depth images. The matching points corresponding to the plurality of lattice depth images are determined according to the matching points between each two lattice depth images. For example, the matching points between each two lattice depth images are taken as the matching points corresponding to the plurality of lattice depth images.

Still referring to FIG. 3, in step S340, a fusion processing is performed on point cloud images of the first resolution respectively corresponding to the plurality of lattice depth images based on the registration result to obtain a dense point cloud map.

In an embodiment, that a fusion processing is performed on the point cloud images of the first resolution respectively corresponding to the plurality of lattice depth images based on the registration result includes: calculating poses among the plurality of lattice depth images based on the matching points; and performing a fusion processing on the point cloud images of the first resolution respectively corresponding to the plurality of lattice depth images based on the poses.

When the fusion processing is performed on the point cloud images of the first resolution respectively corresponding to the plurality of lattice depth images based on the registration result, the payment processing server may calculate poses among the plurality of lattice depth images based on the matching points; and then perform the fusion processing on the point cloud images of the first resolution respectively corresponding to the plurality of lattice depth images based on the calculated poses among the plurality of lattice depth images.

In an embodiment, the calculating poses among the plurality of lattice depth images based on the matching points includes: calculating poses between any two lattice depth images based on matching points between the any two lattice depth images; and calculating poses among the plurality of lattice depth images based on the poses between the any two lattice depth images.

When calculating the poses among the plurality of lattice depth images, the payment processing server may group the lattice depth images in pairs for calculation, that is, calculating, according to matching points between two lattice depth images in each group, poses between the two lattice depth images; and then calculating the poses among the plurality of lattice depth images based on the poses between the two lattice depth images in each group.

The technical solution of the embodiment shown in FIG. 3 enables registration to be performed through point cloud images of a lower resolution (that is, the second resolution), improving the efficiency of image registration. Then, based on a registration result, a fusion processing is performed on the point cloud images of a higher resolution (that is, the first resolution) to obtain a dense point cloud map. Further, the dense point cloud map is converted into a dense lattice depth image, ensuring that the obtained dense lattice depth image has a higher resolution, which helps to improve the accuracy of the face recognition.

Still referring to FIG. 2, in step S230, a face recognition processing is performed on the dense lattice depth image obtained by the fusion processing to obtain a face recognition result.

In an embodiment, after obtaining the face recognition result, the payment processing server may perform a face payment processing based on the face recognition result. In this scenario, a face-based payment device in the embodiments of the present disclosure may include a Dtof sensor configured to acquire lattice depth images of a face, a micro motor connected to the Dtof sensor, and a processor electrically connected to the Dtof sensor. The micro motor is configured to drive the Dtof sensor to rotate to acquire the lattice depth images of the face from different angles. The processor is configured to receive the lattice depth images acquired by the Dtof sensor, and configured to perform the face recognition by the method described in the embodiments. Further, a low-power face recognition can be realized through the Dtof sensor. In addition, the dense lattice depth image is obtained by performing a fusion processing on the plurality of lattice depth images acquired by the Dtof sensor. Therefore, a high-precision face recognition may be realized through the dense lattice depth image, improving the accuracy of the face recognition.

A description of the technical solutions of the embodiments of the present disclosure is provided below with reference to FIG. 4 to FIG. 7.

Figure 4:
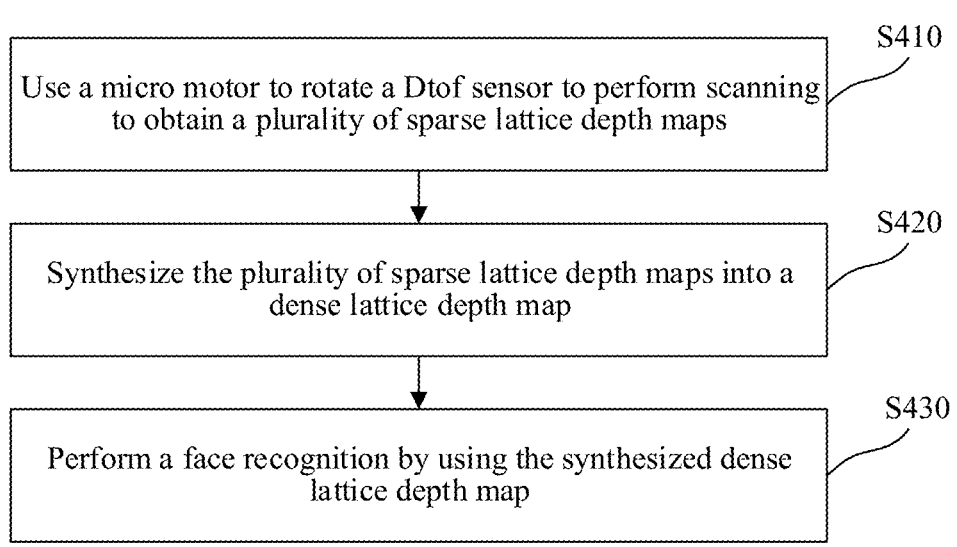
FIG. 4 is a schematic flowchart of a face recognition method according to embodiment(s) of the present disclosure.

FIG. 4 is a flowchart of a face recognition method according to an embodiment of the present disclosure. The face recognition method may be performed by a device with a computing processing function.

Referring to FIG. 4, the face recognition method according to this embodiment of the present disclosure includes the following steps S410 to S430. In step S410, a micro motor is used to rotate a Dtof sensor to perform scanning to obtain a plurality of sparse lattice depth maps. In this step, by using the micro motor to rotate the Dtof sensor to perform scanning, the acquisition of a plurality of sparse lattice depth maps can be realized without the user's perception. In this way, not only the user experience can be improved, but also the costs of the product can be reduced. In addition, an accurate face recognition can be achieved through the plurality of sparse lattice depth maps.

In an embodiment, the lattice depth images are acquired by a Dtof sensor. The Dtof sensor is connected to a micro motor. That a plurality of lattice depth images acquired by the Dtof sensor by performing a depth image acquisition on a target face from different acquisition angles are obtained includes: controlling the micro motor to drive the Dtof sensor to rotate, and obtaining a plurality of lattice depth images acquired for the target face by the Dtof sensor driven by the micro motor.

In step S420, the plurality of sparse lattice depth maps are synthesized into a dense lattice depth map.

In an embodiment of the present disclosure, when the payment processing server synthesizes the plurality of sparse lattice depth maps into a dense lattice depth map, the flow shown in FIG. 5 may be adopted, including the following steps S510 to S530, which are described in detail below:

In an embodiment, that a fusion processing is performed on the plurality of lattice depth images to obtain a dense lattice depth image includes: converting each lattice depth image in the plurality of lattice depth images into a corresponding point cloud image, and performing a fusion processing on a plurality of point cloud images to obtain a dense point cloud map; and converting the dense point cloud map into the dense lattice depth image.

In step S510, the sparse lattice depth map is converted into the sparse point cloud map.

In an embodiment, the payment processing server may convert the sparse lattice depth map into the sparse point cloud map by a coordinate conversion formula between a depth map and a point cloud map.

Figure 6:
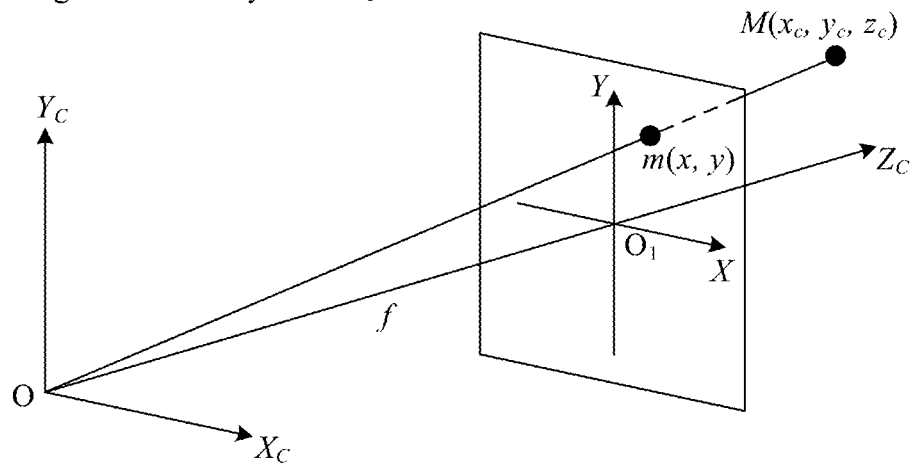
FIG. 6 is a schematic diagram of a conversion relationship between a camera coordinate system and an image coordinate system.

In certain embodiment(s), as shown in FIG. 6, assuming that a camera coordinate system is $O\text{-}X_CY_CZ_C$, an image coordinate system is $O_1\text{-}XY$, and a point in the image coordinate system to which a three-dimensional point $M(x_c, y_c, z_c)$ in the camera coordinate system is mapped is $m(x, y)$. Assuming that focal lengths of a camera on an x-axis and a y-axis are $f_x$ and $f_y$ respectively, and aperture centers of the camera are $c_x$ and $c_y$, then the following formula (1) can be obtained according to the similarity principle of triangles:

$$x = f_x \frac{x_c}{z_c}; \quad y = f_y \frac{y_c}{z_c} \quad \text{Formula (1)}$$

In fact, the aperture center of the camera is not the center of the image, and there is usually a deviation. For example, for a camera corresponding to a resolution of 640×480, intrinsic parameters of the camera are $c_x=316.2$, $c_y=235.7$, $f_x=565.0$, and $f_y=566.3$ respectively. Therefore, the obtained coordinate conversion relationship between the camera coordinate system and the image coordinate system is shown in the following formula (2):

$$x = f_x \frac{x_c}{z_c} + c_x; \quad y = f_y \frac{y_c}{z_c} + c_y \quad \text{Formula (2)}$$

The points in the camera coordinate system are the points in the lattice depth map. If depth coordinates of the point cloud are not considered, the coordinates of the points in the image coordinate system are the coordinates of the points in the point cloud. Therefore, the sparse lattice depth maps can be converted into the sparse point cloud maps through the formula (2).

Figure 5:
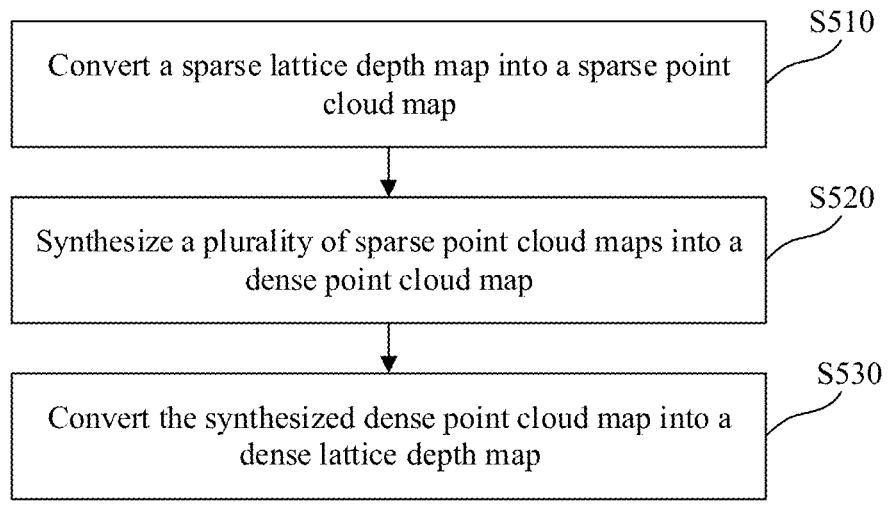
FIG. 5 is a schematic flowchart of synthesizing a plurality of sparse lattice depth maps into a dense lattice depth map according to embodiment(s) of the present disclosure.

Still referring to FIG. 5, in step S520, the plurality of sparse point cloud maps are synthesized into a dense point cloud map.

In an embodiment, when the payment processing server synthesizes the plurality of sparse point cloud maps into a dense point cloud map, two sparse point cloud maps may be used as a group to perform registration. For example, matching points between the two sparse point cloud maps may be calculated by a projection algorithm, and then pose transformation between the two sparse point cloud maps is determined based on the matching points. Further, after obtaining the poses, the plurality of sparse point cloud maps may be synthesized into a dense point cloud map based on the poses.

In step S530, the synthesized dense point cloud map is converted into a dense lattice depth map.

In an embodiment, the payment processing server may reversely convert the dense point cloud map into the dense lattice depth map based on the formula (2).

The technical solution of the embodiment shown in FIG. 5 is to convert the sparse lattice depth maps into the sparse point cloud maps, then directly fuse the sparse point cloud maps to obtain the dense point cloud map, and then convert the dense point cloud map into the dense lattice depth map.

Figure 7:
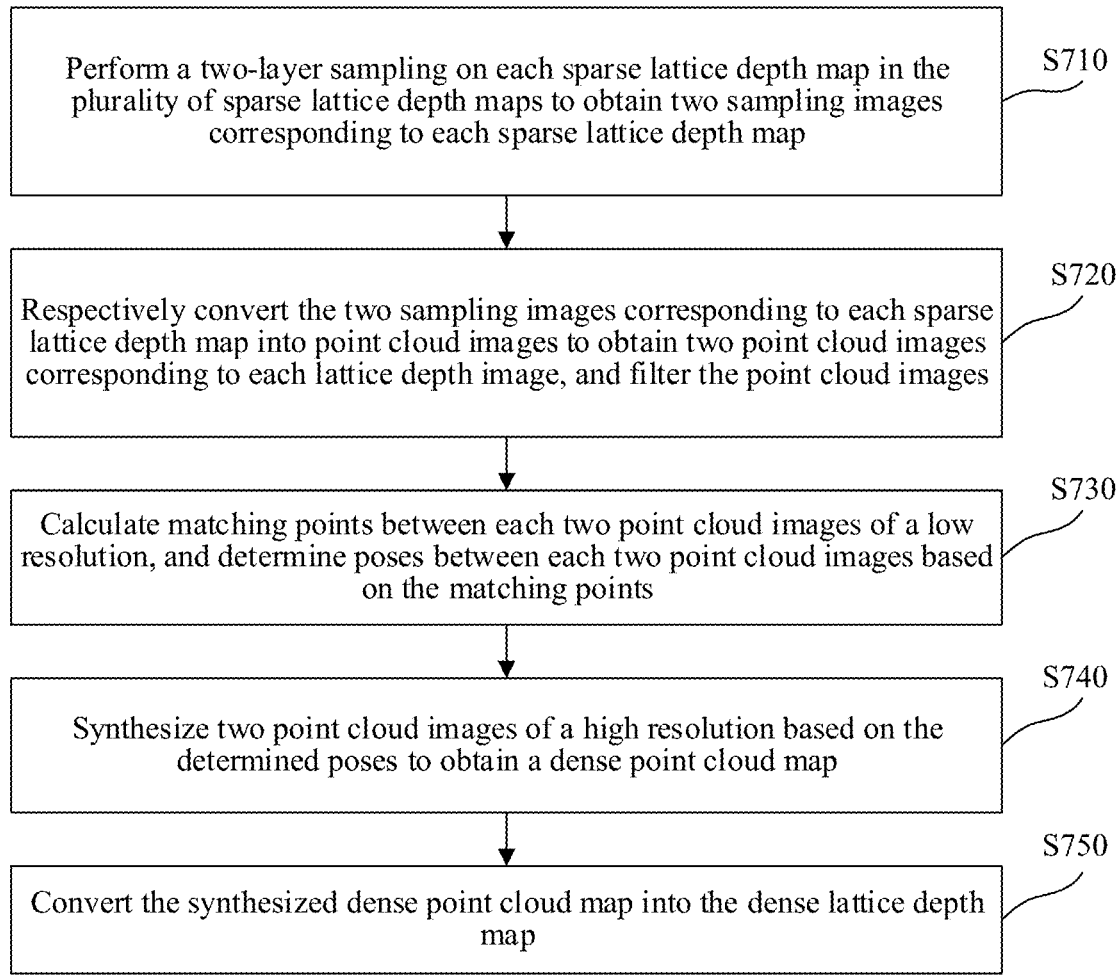
FIG. 7 is a schematic flowchart of synthesizing a plurality of sparse lattice depth maps into a dense lattice depth map according to embodiment(s) of the present disclosure.

In an embodiment, the process of synthesizing the plurality of sparse lattice depth maps into a dense lattice depth map in step S420 may further include the following steps, as shown in FIG. 7:

Step S710: Perform a two-layer sampling on each sparse lattice depth map in the plurality of sparse lattice depth maps to obtain two sampling images corresponding to each sparse lattice depth map.

For example, a first layer sampling with a resolution of 640×480 and a second layer sampling with a resolution of 320×240 may be performed on a lattice depth map with a resolution of 640×480. In this way, two sampling images are obtained for each sparse lattice depth map.

In an embodiment, that a sampling processing is performed on each lattice depth image in the plurality of lattice depth images through a plurality of sampling scales includes: performing a sampling processing on each lattice depth image in the plurality of lattice depth images through two sampling scales to obtain a sampling image of a first resolution and a sampling image of a second resolution corresponding to each lattice depth image, where the first resolution is less than or equal to a resolution of each lattice depth image.

Step S720: Respectively convert the two sampling images corresponding to each sparse lattice depth map into point cloud images to obtain two point cloud images corresponding to each lattice depth image, and filter the point cloud images.

In an embodiment, for each sparse lattice depth map in the plurality of sparse lattice depth maps, the payment processing server may respectively convert two sampling images corresponding to each sparse lattice depth map into point cloud images based on the formula (2).

Step S730: Calculate matching points between each two point cloud images of a low resolution, and determine poses between each two point cloud images based on the matching points.

In an embodiment, for example, if a first layer sampling with a resolution of 640×480 and a second layer sampling with a resolution of 320×240 are performed on a lattice depth map with a resolution of 640×480, matching points can be calculated through a point cloud image corresponding to a sampling image with a resolution of 320×240, and then poses can be calculated based on the matching points. In certain embodiment(s), the matching points between the point cloud images may be calculated by a projection algorithm.

Step S740: Synthesize two point cloud images of a high resolution based on the determined poses to obtain a dense point cloud map.

In an embodiment, for example, if a first layer sampling with a resolution of 640×480 and a second layer sampling with a resolution of 320×240 are performed on a lattice depth map with a resolution of 640×480, after determining poses between each two point cloud images, the payment processing server may synthesize point cloud images respectively corresponding to sampling images with a resolution of 640×480 to obtain a dense point cloud map.

Step S750: Convert the synthesized dense point cloud map into the dense lattice depth map.

In an embodiment, the dense point cloud map may be reversely converted into the dense lattice depth map based on the formula (2).

Still referring to FIG. 4, in step S430, a face recognition is performed by using the synthesized dense lattice depth map.

In an embodiment, after obtaining the face recognition result, a face payment processing may be performed based on the face recognition result. It can be seen that, in the technical solutions of the embodiments of the present disclosure, a low-power face recognition can be realized through the Dtof sensor. In addition, the dense lattice depth image is obtained by performing a fusion processing on the plurality of lattice depth images acquired by the Dtof sensor. Therefore, a high-precision face recognition may be realized through the dense lattice depth image, improving the accuracy of the face recognition.

The following describes apparatus embodiments of the present disclosure, which can be used for performing the face image processing method in the embodiments of the present disclosure. For details not disclosed in the apparatus embodiments of the present disclosure, reference may be made to the embodiments of the face image processing method of the present disclosure.

Figure 8:
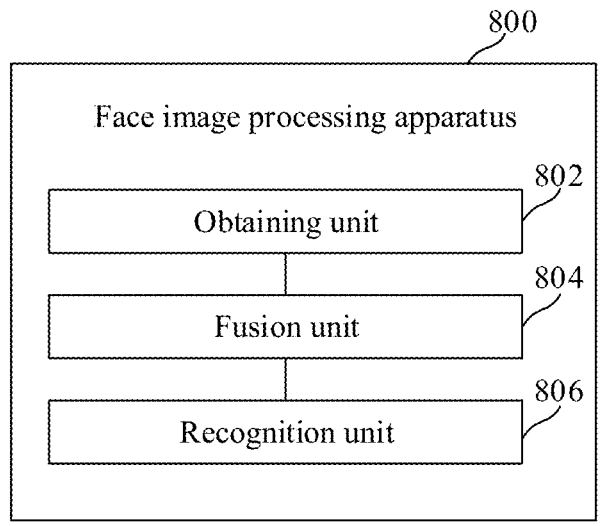
FIG. 8 is a schematic block diagram of a face image processing apparatus according to embodiment(s) of the present disclosure.

FIG. 8 is a block diagram of a face image processing apparatus according to an embodiment of the present disclosure. The face image processing apparatus may be disposed in a device with a computing processing function, for example, may be disposed in the payment processing server 103 shown in FIG. 1.

Referring to FIG. 8, the face image processing apparatus 800 according to this embodiment of the present disclosure includes: an obtaining unit 802, a fusion unit 804, and a recognition unit 806.

The obtaining unit 802 is configured to obtain a plurality of lattice depth images acquired by performing a depth image acquisition on a target face from different acquisition angles. The fusion unit 804 is configured to perform a fusion processing on the plurality of lattice depth images to obtain a dense lattice depth image. The recognition unit 806 is configured to perform a face recognition processing on the dense lattice depth image to obtain a face recognition result.

In an embodiment, the lattice depth images are acquired by a Dtof sensor. The Dtof sensor is connected to a micro motor. The obtaining unit 802 is configured to control the micro motor to drive the Dtof sensor to rotate, and obtain a plurality of lattice depth images acquired for the target face by the Dtof sensor driven by the micro motor.

In an embodiment, the fusion unit 804 includes: a processing unit 8041, configured to convert each lattice depth image in the plurality of lattice depth images into a corresponding point cloud image, and perform a fusion processing on a plurality of point cloud images to obtain a dense point cloud map; and a conversion unit 8042, configured to convert the dense point cloud map into the dense lattice depth image.

In an embodiment, the processing unit 8041 is configured to perform a sampling processing on each lattice depth image in the plurality of lattice depth images through a plurality of sampling scales to obtain a plurality of sampling images corresponding to each lattice depth image; respectively convert, for each lattice depth image in the plurality of lattice depth images, the plurality of sampling images corresponding to the corresponding lattice depth image into the point cloud images, to obtain a plurality of point cloud images corresponding to the corresponding lattice depth image, where the plurality of point cloud images corresponding to the corresponding lattice depth image include point cloud images of a first resolution and point cloud images of a second resolution, the first resolution being greater than the second resolution; register point cloud images of the second resolution respectively corresponding to the plurality of lattice depth images to obtain a registration result; and perform a fusion processing on point cloud images of the first resolution respectively corresponding to the plurality of lattice depth images based on the registration result to obtain the dense point cloud map.

In an embodiment, the processing unit 8041 is configured to respectively convert, for each lattice depth image in the plurality of lattice depth images, the plurality of sampling images corresponding to the corresponding lattice depth image into the point cloud images based on a conversion relationship between the lattice depth images and point cloud coordinates.

In an embodiment, the processing unit 8041 is configured to perform a computing processing of matching points on the point cloud images of the second resolution respectively corresponding to the plurality of lattice depth images, to obtain matching points corresponding to the plurality of lattice depth images; and register the point cloud images of the second resolution respectively corresponding to the plurality of lattice depth images according to the matching points.

In an embodiment, the processing unit 8041 is configured to calculate, for point cloud images of the second resolution respectively corresponding to any two lattice depth images, a projection point of a point on one point cloud image onto another point cloud image by a projection algorithm, to obtain matching points between the any two lattice depth images; and determine matching points corresponding to the plurality of lattice depth images according to the matching points between the any two lattice depth images.

In an embodiment, the processing unit 8041 is configured to calculate poses among the plurality of lattice depth images based on the matching points; and perform a fusion processing on the point cloud images of the first resolution respectively corresponding to the plurality of lattice depth images based on the poses.

In an embodiment, the processing unit 8041 is configured to calculate poses between any two lattice depth images based on matching points between the any two lattice depth images; and calculate poses among the plurality of lattice depth images based on the poses between the any two lattice depth images.

In an embodiment, the processing unit 8041 is configured to perform a sampling processing on each lattice depth image in the plurality of lattice depth images through two sampling scales to obtain a sampling image of a first resolution and a sampling image of a second resolution corresponding to each lattice depth image, where the first resolution is less than or equal to a resolution of each lattice depth image.

In an embodiment, based on the solutions, the face image processing apparatus 800 further includes: a payment unit 808, configured to perform, after obtaining the face recognition result, a face payment processing based on the face recognition result.

Each module in the face image processing apparatus may be implemented in whole or in part by software, hardware, and a combination thereof. The network interface may be an Ethernet card, a wireless network card, or the like. The modules may be embedded in or independent of the processor in the server in the form of hardware, or may be stored in the memory in the server in the form of software, so that the processor can call and execute operations corresponding to the modules.

In some embodiments, a computing device is provided, including a memory and one or more processors. The memory stores computer-readable instructions, the computer-readable instructions, when executed by the one or more processors, causing the one or more processors to perform the steps of the face image processing method described above. The steps of the face image processing method may be the steps in the face image processing method in the various embodiments described above.

In some embodiments, one or more non-volatile readable storage media storing computer-readable instructions are provided, the computer-readable instructions, when executed by one or more processors, causing the one or more processors to perform the steps of the face image processing method described above. The steps of the face image processing method may be the steps in the face image processing method in the various embodiments described above.

In some embodiments, a computer program product or a computer program is provided.

The computer program product or the computer program includes computer instructions, and the computer instructions are stored in a computer-readable storage medium. The processor of the computing device reads the computer instructions from the computer-readable storage medium. The processor executes the computer instructions, so that the computing device performs the steps of the various method embodiments described above.

Figure 9:
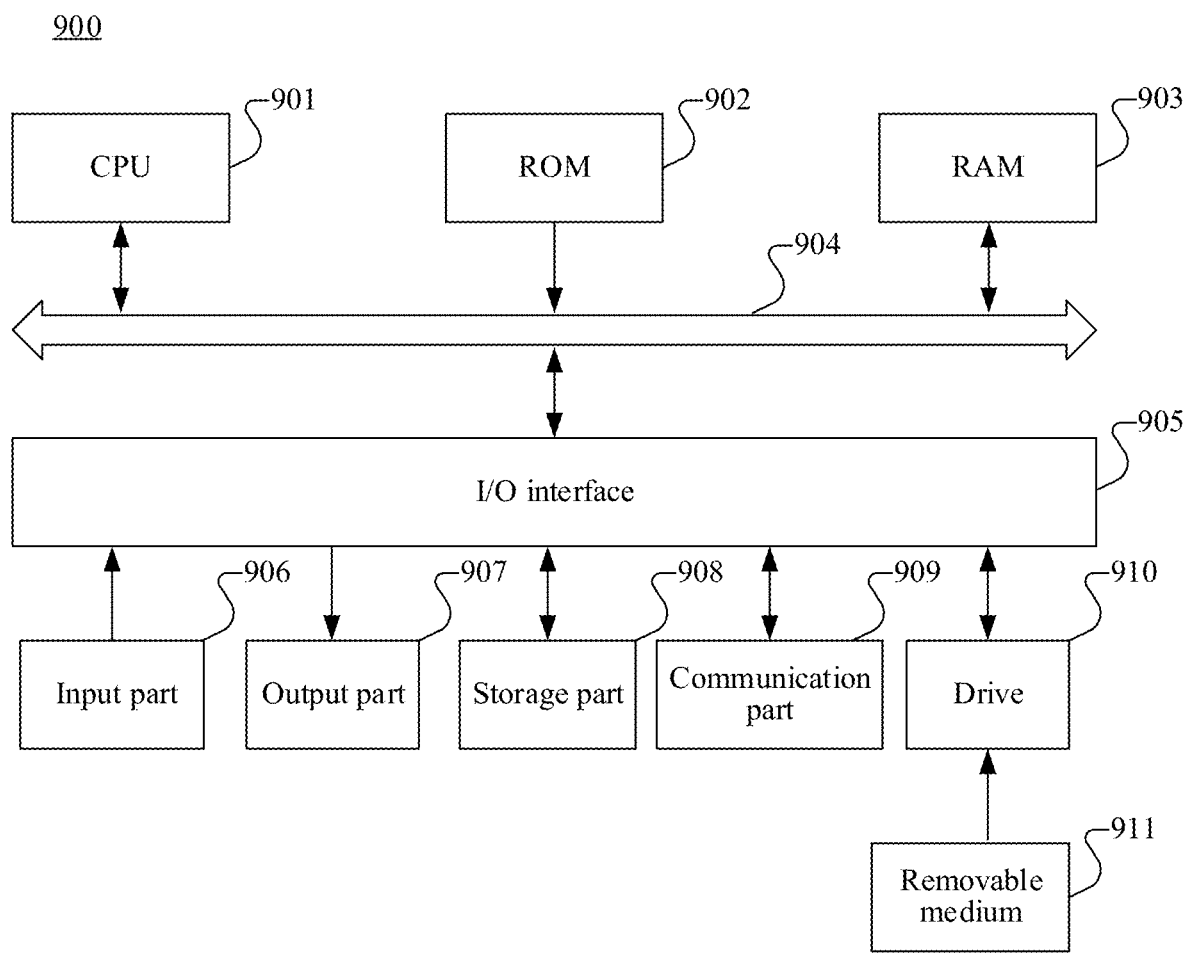
FIG. 9 is a schematic structural diagram of a computer system adapted to implement an electronic device according to embodiment(s) of the present disclosure.

FIG. 9 is a schematic structural diagram of a computer system adapted to implement an electronic device according to an embodiment of the present disclosure.

A computer system 900 of an electronic device shown in FIG. 9 is only an example, which is not to impose any limitation on the function and scope of use of the embodiments of the present disclosure.

As shown in FIG. 9, the computer system 900 includes a central processing unit (CPU) 901, which can execute various appropriate actions and processing according to a program stored in a read-only memory (ROM) 902 or a program loaded from a storage part 908 to a random access memory (RAM) 903, such as performing the methods described in the embodiments. The RAM 903 further stores various programs and data desirable for operating the system. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, or the like; an output part 907 including a cathode ray tube (CRT), a liquid crystal display (LCD), a speaker, or the like; a storage part 908 including a hard disk or the like; and a communication part 909 including a network interface card such as a local area network (LAN) card, a modem, or the like. The communication part 909 performs communication processing by using a network such as the Internet. A drive 910 is also connected to the I/O interface 905 as desirable. A removable medium 911, such as a disk, an optical disc, a magneto-optical disc, or a semiconductor memory, is installed on the drive 910 as desirable, so that a computer program read from the removable medium 911 is installed in the storage part 908 as desirable.

Particularly, according to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed through the communication part 909 from a network, and/or installed from the removable medium 911. When the computer program is executed by the CPU 901, the various functions defined in the system of the present disclosure are executed.

The computer-readable medium shown in the embodiments of the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described may also be set in a processor. Names of the units do not constitute a limitation on the units in a specific scenario.

According to another aspect, the present disclosure further provides a computer-readable medium. The computer-readable medium may be included in the electronic device described in the embodiments, or may exist alone and is not disposed in the electronic device. The computer-readable medium carries one or more programs, the one or more programs, when executed by the electronic device, causing the electronic device to implement the method described in the embodiments.

Although a plurality of modules or units of a device configured to perform actions are discussed in the description, such division is not mandatory. Actually, according to the implementations of the present disclosure, the features and functions of two or more modules or units described above may be implemented in one module or unit. Conversely, features and functions of one module or unit described above may be further divided into a plurality of modules or units for implementation.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Through the descriptions of the implementations, a person skilled in the art easily understands that the exemplary implementations described herein may be implemented through software, or may be implemented through software located in combination with suitable hardware. Therefore, the technical solutions of the embodiments of the present disclosure may be implemented in the form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

What is claimed is:

1. A face image processing method, performed by a payment processing server, the method comprising:
    obtaining a plurality of lattice depth images acquired by performing a depth image acquisition on a target face from different acquisition angles;
    converting each of the plurality of lattice depth images into a point cloud image, to obtain a plurality of point cloud images;
    performing a fusion processing on the plurality of point cloud images to obtain a dense point cloud map;
    converting the dense point cloud map into a dense lattice depth image; and
    performing a face recognition processing on the dense lattice depth image to obtain a face recognition result.

2. The face image processing method according to claim 1, wherein the lattice depth images are acquired by a Dtof sensor, the Dtof sensor being connected to a micro motor; and obtaining the plurality of lattice depth images comprises:
    controlling the micro motor to drive the Dtof sensor to rotate, and obtaining the plurality of lattice depth images acquired by the Dtof sensor driven by the micro motor.

3. The face image processing method according to claim 1, wherein converting the each lattice depth image comprises:
    performing a sampling processing on the each lattice depth image in the plurality of lattice depth images through a plurality of sampling scales to obtain a plurality of sampling images corresponding to the each lattice depth image;
    converting the plurality of sampling images corresponding to the corresponding lattice depth image into the point cloud images, to obtain a plurality of point cloud images corresponding to the corresponding lattice depth image, wherein the plurality of point cloud images corresponding to the corresponding lattice depth image comprise point cloud images of a first resolution and point cloud images of a second resolution, the first resolution being greater than the second resolution;
    registering point cloud images of the second resolution respectively corresponding to the plurality of lattice depth images to obtain a registration result; and
    performing a fusion processing on point cloud images of the first resolution respectively corresponding to the plurality of lattice depth images based on the registration result to obtain the dense point cloud map.

4. The face image processing method according to claim 3, wherein converting the plurality of sampling images comprises:
    converting the plurality of sampling images corresponding to the corresponding lattice depth image into the point cloud images based on a conversion relationship between the lattice depth images and point cloud coordinates.

5. The face image processing method according to claim 3, wherein registering the point cloud images comprises:
    performing a computing processing of matching points on the point cloud images of the second resolution corresponding to the plurality of lattice depth images, to obtain matching points corresponding to the plurality of lattice depth images; and
    registering the point cloud images of the second resolution corresponding to the plurality of lattice depth images according to the matching points.

6. The face image processing method according to claim 5, wherein performing the computing processing of the matching points comprises:
    calculating a projection point of a point on one point cloud image onto another point cloud image by a projection algorithm, to obtain matching points between the any two lattice depth images; and
    determining matching points corresponding to the plurality of lattice depth images according to the matching points between the any two lattice depth images.

7. The face image processing method according to claim 5, wherein performing the fusion processing on the point cloud images comprises:
  calculating poses among the plurality of lattice depth images based on the matching points; and
  performing a fusion processing on the point cloud images of the first resolution corresponding to the plurality of lattice depth images based on the poses.

8. The face image processing method according to claim 7, wherein calculating the poses comprises:
  calculating poses between any two lattice depth images based on matching points between the any two lattice depth images; and
  calculating poses among the plurality of lattice depth images based on the poses between the any two lattice depth images.

9. The face image processing method according to claim 3, wherein performing the sampling processing comprises:
  performing a sampling processing on the each lattice depth image in the plurality of lattice depth images through two sampling scales to obtain a sampling image of a first resolution and a sampling image of a second resolution corresponding to the each lattice depth image, wherein the first resolution is less than or equal to a resolution of the each lattice depth image.

10. The face image processing method according to claim 1, further comprising:
  performing a face payment processing based on the face recognition result.

11. A face image processing apparatus, comprising: a memory storing computer program instructions; and a processor coupled to the memory and configured to execute the computer program instructions and perform:
  obtaining a plurality of lattice depth images acquired by performing a depth image acquisition on a target face from different acquisition angles;
  converting each of the plurality of lattice depth images into a point cloud image, to obtain a plurality of point cloud images;
  performing a fusion processing on the plurality of point cloud images to obtain a dense point cloud map;
  converting the dense point cloud map into a dense lattice depth image; and
  performing a face recognition processing on the dense lattice depth image to obtain a face recognition result.

12. The face image processing apparatus according to claim 11, wherein the lattice depth images are acquired by a Dtof sensor, the Dtof sensor being connected to a micro motor; and obtaining the plurality of lattice depth images comprises:
  controlling the micro motor to drive the Dtof sensor to rotate, and obtaining the plurality of lattice depth images acquired by the Dtof sensor driven by the micro motor.

13. The face image processing apparatus according to claim 11, wherein converting the each lattice depth image comprises:
  performing a sampling processing on the each lattice depth image in the plurality of lattice depth images through a plurality of sampling scales to obtain a plurality of sampling images corresponding to the each lattice depth image;
  converting the plurality of sampling images corresponding to the corresponding lattice depth image into the point cloud images, to obtain a plurality of point cloud images corresponding to the corresponding lattice depth image, wherein the plurality of point cloud images corresponding to the corresponding lattice depth image comprise point cloud images of a first resolution and point cloud images of a second resolution, the first resolution being greater than the second resolution;
  registering point cloud images of the second resolution respectively corresponding to the plurality of lattice depth images to obtain a registration result; and
  performing a fusion processing on point cloud images of the first resolution respectively corresponding to the plurality of lattice depth images based on the registration result to obtain the dense point cloud map.

14. The face image processing apparatus according to claim 13, wherein converting the plurality of sampling images comprises:
  converting the plurality of sampling images corresponding to the corresponding lattice depth image into the point cloud images based on a conversion relationship between the lattice depth images and point cloud coordinates.

15. The face image processing apparatus according to claim 13, wherein registering the point cloud images comprises:
  performing a computing processing of matching points on the point cloud images of the second resolution corresponding to the plurality of lattice depth images, to obtain matching points corresponding to the plurality of lattice depth images; and
  registering the point cloud images of the second resolution corresponding to the plurality of lattice depth images according to the matching points.

16. The face image processing apparatus according to claim 15, wherein performing the computing processing of the matching points comprises:
  calculating a projection point of a point on one point cloud image onto another point cloud image by a projection algorithm, to obtain matching points between the any two lattice depth images; and
  determining matching points corresponding to the plurality of lattice depth images according to the matching points between the any two lattice depth images.

17. The face image processing apparatus according to claim 15, wherein performing the fusion processing on the point cloud images comprises:
  calculating poses among the plurality of lattice depth images based on the matching points; and
  performing a fusion processing on the point cloud images of the first resolution corresponding to the plurality of lattice depth images based on the poses.

18. A non-transitory computer-readable storage medium storing computer program instructions executable by at least one processor to perform:
  obtaining a plurality of lattice depth images acquired by performing a depth image acquisition on a target face from different acquisition angles;
  converting each of the plurality of lattice depth images into a point cloud image, to obtain a plurality of point cloud images;
  performing a fusion processing on the plurality of point cloud images to obtain a dense point cloud map;
  converting the dense point cloud map into a dense lattice depth image; and
  performing a face recognition processing on the dense lattice depth image to obtain a face recognition result.

* * * * *